Sept. 9, 1941.      D. R. CLARKSON      2,255,539
APPARATUS FOR TREATMENT OF IRON SULPHATE
Filed Jan. 5, 1939
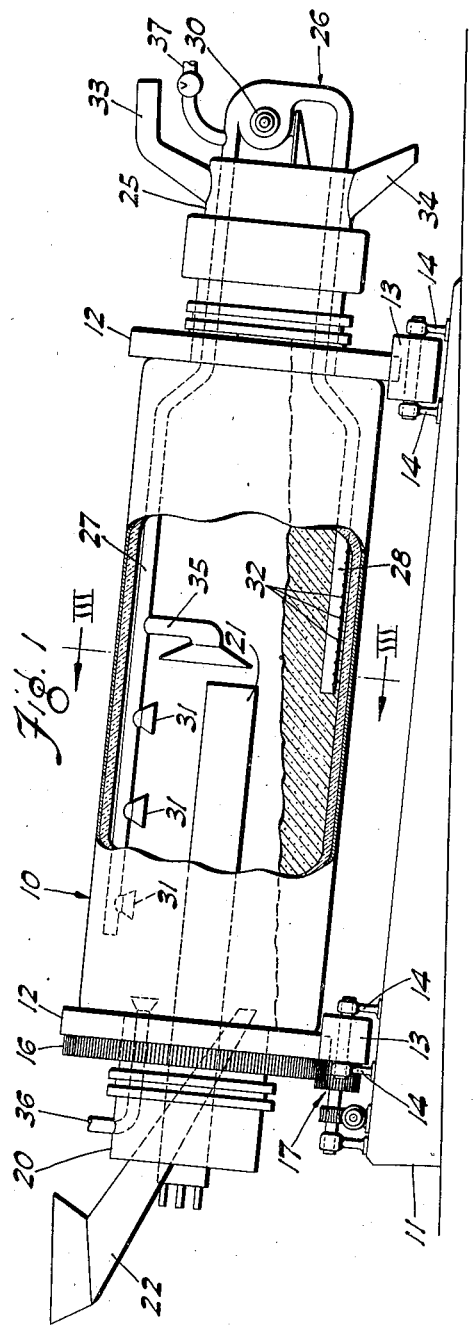
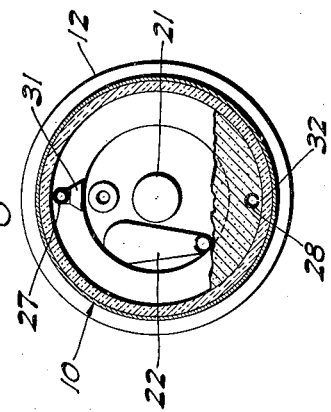
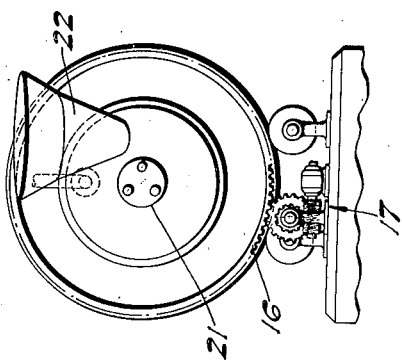
INVENTOR
DOUGLAS R. CLARKSON
BY
Beau, Brooks, Buckley & Beau.
ATTORNEYS Patented Sept. 9, 1941

2,255,539

UNITED STATES PATENT OFFICE 2,255,539

APPARATUS FOR TREATMENT OF IRON SULPHATE

Douglas R. Clarkson, Buffalo, N. Y., assignor to Ella Van Gorder, Buffalo, N. Y.

Application January 5, 1939, Serial No. 249,470

7 Claims. (Cl. 23—279)

This invention relates to the recovery and production of oxides of sulphur and iron from materials containing iron sulphate.

My present invention has particularly advantageous application in the production of steel sheets and the like. After the formation of a steel sheet, strip, or the like, it is desired to rid the article of the surface scale left thereon as a result of the fabricating operation. A convenient method of removing such scale, which is an oxide of iron, is to immerse the piece or part in a sulphuric acid solution. The oxide of iron reacts with the acid to form ferrous sulphate.

As the pickling bath is used, the ferrous sulphate gradually replaces the sulphuric acid and the concentration of the acid solution drops from its original value of about twenty per cent to about three and one-half per cent, at which point the pickling liquor is considered spent. During the time that the acid concentration is decreasing, the concentration of ferrous sulphate in the liquor increases. In the past it has been the custom to discharge such spent pickle liquors into rivers and streams.

The natural objection to pollution of water in this manner has recently become more strongly felt because of general public activity in the direction of eliminating pollution of public bodies of water and a method of handling pickle liquors in a manner which eliminates the necessity of getting rid of spent liquor is highly desirable. My invention solves the problem of dealing with spent pickle liquor and has the further advantage of utilizing its constituents to produce sulphuric acid from which fresh pickle liquor may be made if desired. The economy of this process of regeneration will, it is believed, not require discussion.

In preparing to pursue the method of my invention, the residual acid content of spent pickle liquor is neutralized with scrap iron, lime, or in any suitable manner, and the remaining solution of ferrous sulphate is evaporated to dryness, leaving dry powdered ferrous sulphate. This dehydration may be accomplished conveniently in a spray drier, although other conventional drying methods may be used. When spray drying is employed a product in the form of finely powdered ferrous sulphate monohydrate results.

The finely powdered ferrous sulphate monohydrate is then treated in accordance with the novel method of my invention and in connection with such treatment I provide a novel retort or furnace which combines calcination of the ferrous sulphate with catalytic action upon the gaseous constituents to produce from the ferrous sulphate a maximum amount of sulphur trioxide for subsequent use in the preparation of sulphuric acid.

The method of my invention includes subjecting the ferrous sulphate to a temperature of between about 450 and 875 degrees centigrade, in the presence of available oxygen, whereby there is evolved a mixture of sulphur dioxide and sulphur trioxide, converting ferrous sulphate to ferric oxide. The gases so evolved, together with the available oxygen, are then taken off above the mass of solid material which forms the charge and conveyed to a point beneath or within the mass of solid material containing ferric oxide, where they are released and permitted to pass through the charge. This repassage results in the conversion of sulphur dioxide to sulphur trioxide, which is the desired resulting product.

An effective method of pursuing the novel method has been found to be to release the evolved gases within or beneath the mass of solid material after it has passed from the zone where the gases are initially evolved. When this is done the released gases pass upwardly through a mass comprising chiefly ferric oxide which acts catalytically to promote the acquisition by the sulphur dioxide molecules of an additional oxygen atom to form sulphur trioxide. The sulphur trioxide so obtained is taken off and employed in the manner hereinbefore described.

The method just described is preferably accomplished in apparatus comprising a drum, or cylinder, which is mounted to rotate on a nearly horizontal axis. A relatively stationary, longitudinally extending tube is disposed within the cylinder and adjacent the bottom thereof and a charge of dry ferrous sulphate is placed in and continuously fed to the bottom of the cylinder surrounding the tube and rotation of the cylinder causes agitation of the charge without substantially removing it from the vicinity of the relatively stationary tube. The tube is perforated along its length for introducing to the charge a supply of gas in a manner and for a purpose which will hereinafter appear.

The axis of the drum is preferably inclined somewhat to the horizontal so that the charge will, during rotation of the drum, feed toward the low or discharge end of the cylinder. The charge of ferrous sulphate is gradually replenished at the high or charging end of the cylinder and the operation of the apparatus is thus rendered continuous.

A preferred but merely exemplary form of apparatus for use in conjunction with my invention is illustrated in the accompanying drawing in which:

Fig. 1 is a general side elevational view of the apparatus with a portion of the drum broken away to better illustrate the interior thereof;

Fig. 2 is an end elevational view taken from the left end as viewed in Fig. 1; and Fig. 3 is a transverse vertical cross sectional view of the cylinder or drum taken approximately on the line III—III of Fig. 1.

In the drawing like characters of reference denote like parts and the numeral 10 designates a rotatable cylindrical calcining furnace which is mounted for driven rotation upon a slightly inclined foundation 11. Each end bearing portion 12 of the rotatable furnace 10 may rest upon a pair of supporting rollers 13 having suitable supporting bearing members 14.

A ring gear is associated with the furnace 10 and in the illustrated embodiment such ring gear is shown at 16, adjacent one of the bearing portions 12. The specific mode of rotating the furnace is not a feature of the present invention and one form of motor drive means, engaging the ring gear 16, is indicated generally at 17. In the drawing the left end of the furnace, as seen in Fig. 1, is in a relatively elevated position due to the inclined formation of the foundation 11, and this is the feed or entry end of the furnace. The elevation of this end of the furnace results in movement of material through the furnace from the feed or entry end to the other end, where material is discharged, in a manner which will hereinafter appear.

Relatively stationary means 20 are disposed at one end of the rotatable furnace 10, the left end as shown in Fig. 1 of the drawing, and such means support and position an electric heating element 21 of conventional form which projects into the furnace 10 as illustrated. The heating element 21 is preferably one which will maintain any selected temperature between 450 and 875 degrees centigrade in the general region of the heating element itself, that is to say, in the left hand end of the furnace. The means 20 may also conveniently support an entry duct 22 for feeding the charge into the furnace.

Similar relatively stationary means 25 at the discharge end of the furnace 10 position and give support to a generally U-shaped conduit 26, one of whose legs projects into and extends along the upper portion of the interior of the furnace 10 as depicted at 27. The other leg 28 of the conduit 26 also extends into the furnace 10 but is adapted to be disposed along the bottom thereof. The portion 28 of the conduit 26 is substantially shorter than the portion 27 and is preferably approximately half the full length of the furnace whereby it is disposed only in the region of the right hand end of the furnace.

A circulating pump 30, driven by suitable means not necessary to be illustrated, is interposed in the conduit 26, preferably between the portions 27 and 28, and causes fluid flow in a direction from the portion 27 to the portion 28. The portion 27 of the conduit 26 is provided, adjacent the feed end of the furnace, with a plurality of downwardly facing collecting bells or funnels 31. If desired, the right hand collecting bell, numbered 35, may be directed toward the charging end of the furnace, as indicated in Fig. 1, whereby gases flowing toward the discharge end of the furnace are collected.

The portion 28 of the conduit 26 is provided with a number of longitudinally spaced openings 32 located within the interior of the furnace and between the end of the portion 28 and the discharge end of the furnace 10. These openings are preferably formed along the bottom of the conduit portion 28.

It is to be understood that the conduit 26 does not rotate with the furnace 10, the portions 27 and 28 retaining their positions adjacent the ceiling and floor respectively of the furnace 10. The terminal portions of each of the conduit portions 27 and 28, within the furnace 10, are preferably closed, so that their only comunication with the interior of the furnace 10 is by means of the collecting bells or funnels 31 and the longitudinally spaced openings 32 respectively.

The relatively stationary means 25 at the discharge end of the furnace may also conveniently support discharge ducts for both solid and gaseous products. A discharge duct 33 for gaseous products is preferably located in the upper portion thereof while a discharge duct 34 for solid end products is found in the lower portion. The gas discharge duct 33 may be connected to any suitable conduit means for carrying the gaseous products to any suitable receptacle or place of storage or point of further use. The discharge from the duct 34 may be into a suitable receptacle or conveying vehicle disposed therebeneath or the duct may be extended to convey solid matter directly to a storing receptacle or place of further use.

It will be noted that the level of the charge in the retort is controlled and determined by the height of the bottom of the discharge opening at the right hand end of the furnace and connecting with the duct 34. The inclination of the furnace taken with the slow agitation of the charge due to rotation of the furnace by the drive means 17 will cause the depth of the charge to be progressively greater toward the delivery end of the furnace.

The greater depth, that is to say the greater volume, of the charge at the delivery end of the furnace serves a plurality of purposes. In the first place, it insures adequate coverage of the conduit portion 28 at all times and insures the presence of enough solid material above the conduit portion 28 to accomplish the objects of the invention.

A further advantage derived from the presence of more solid material at the right hand end of the furnace is due to the fact that the ferrous sulphate with which the furnace is initially charged is gradually changed to ferric oxide in its passage through the furnace. It is this latter material, the ferric oxide, which catalytically promotes the oxidation of sulphur dioxide to sulphur trioxide and the presence of an abundance of the catalyst in the region of the conduit portion 28, where the originally evolved gases are released to pass through the solid material. On the other hand, a great depth of solid material, ferrous sulphate, at the left hand end of the furnace, may impede the evolution of gas in the first instance. A supply of oxygen, which may comprise merely a forced flow of air into the furnace, is admitted by means of a conduit 36. In addition to the air inlet 36, an auxiliary valve controlled air inlet 37 may be interposed in the conduit 26, preferably between the collecting bells 31, 35 and the circulating pump 30, as appears in Fig. 1.

In operation, ferrous sulphate, preferably in the monohydrate form, is substantially continuously fed into the furnace through the duct 22; the originally evolved gases are continuously collected by the bells 31 and conveyed to conduit portion 28 for release in contact with an abundance of ferric oxide; and the final gaseous product comprising chiefly sulphur trioxide is taken off at 33.

While specific details of the method and apparatus of my invention have been delineated herein, it is to be understood that the invention is not so limited, excepting as defined in the appended claims.

What is claimed is:

1. Apparatus for the production of sulphur trioxide from ferrous sulphate and oxygen comprising an elongate cylindrical chamber, bearing means therefor permitting rotation of the chamber upon its longitudinal axis, means for introducing solid material at one end of said chamber and means for delivering gaseous products at the other end thereof, and a fluid conduit having spaced substantially parallel terminal portions, one of said terminal portions being disposed in the upper portion of the chamber interior and in communication therewith adjacent the entry end thereof, the other of said terminal portions being disposed in the lower portion thereof and in communication therewith adjacent the delivery end thereof.

2. Apparatus for the production of sulphur trioxide from ferrous sulphate and oxygen comprising an elongate cylindrical chamber, means for introducing solid material at one end of said chamber and means for delivering gaseous products at the other end thereof, and a fluid conduit having spaced substantially parallel terminal portions, one of said terminal portions being disposed in the upper portion of the chamber interior and in communication therewith adjacent the entry end thereof, the other of said terminal portions being disposed in the lower portion thereof and in communication therewith adjacent the delivery end thereof.

3. Apparatus for the production of sulphur trioxide from ferrous sulphate and oxygen comprising an elongate cylindrical chamber, bearing means therefor permitting rotation of the chamber upon its longitudinal axis, said bearing means being arranged so that the axis of rotation of the chamber is somewhat inclined to the horizontal whereby rotation of said chamber agitates a charge of material in said chamber and causes movement of the material toward the lower end of the chamber, means for introducing solid material at the higher end of said chamber and means for delivering gaseous products at the other end thereof, and a fluid conduit having spaced substantially parallel terminal portions, one of said terminal portions being disposed in the upper portion of the chamber interior and in communication therewith and the other of said terminal portions being disposed in the lower portion thereof and in communication therewith.

4. Apparatus for the production of sulphur trioxide from ferrous sulphate and oxygen comprising an elongate cylindrical chamber bearing means therefor permitting rotation of the chamber upon its longitudinal axis, said bearing means being arranged so that the axis of rotation of the chamber is somewhat inclined to the horizontal whereby rotation of said chamber agitates a charge of material in said chamber and causes movement of the material toward the lower end of the chamber, means for introducing solid material at the higher end of said chamber and means for delivering evolved gases at the other end thereof, and a fluid conduit having spaced substantially parallel terminal portions, one of said terminal portions being disposed in the upper portion of the chamber interior and in communication therewith adjacent the entry end thereof, the other of said terminal portions being disposed in the lower portion thereof and in communication therewith adjacent the delivery end thereof.

5. Apparatus for the production of sulphur trioxide from ferrous sulphate and oxygen comprising an elongate cylindrical chamber, bearing means therefor permitting rotation of the chamber upon its longitudinal axis, means for introducing solid material at one end of said chamber and means for delivering evolved gases at the other end thereof, and a fluid conduit having spaced substantially parallel terminal portions, one of said terminal portions being disposed in the upper portion of the chamber interior and in communication therewith and the other of said terminal portions being disposed in the lower portion thereof and in communication therewith.

6. Apparatus for the production of sulphur trioxide from ferrous sulphate and oxygen comprising an elongate cylindrical chamber, bearing means therefor permitting rotation of the chamber upon its longitudinal axis, means for introducing solid material at one end of said chamber and means for delivering gaseous products at the other end thereof, a fluid conduit having spaced substantially parallel terminal portions, one of said terminal portions being disposed in the upper portion of the chamber interior and in communication therewith and the other of said terminal portions being disposed in the lower portion thereof and in communication therewith, and heating means in said chamber and disposed adjacent the receiving end thereof.

7. Apparatus for the production of sulphur trioxide from ferrous sulphate and oxygen comprising an elongate cylindrical chamber, bearing means therefor permitting rotation of the chamber upon its longitudinal axis, means for introducing solid material at one end of said chamber and means for delivering gaseous products at the other end thereof, a fluid conduit having spaced substantially parallel terminal portions, one of said terminal portions being disposed in the upper portion of the chamber interior and in communication therewith adjacent the entry end thereof, the other of said terminal portions being disposed in the lower portion thereof and in communication therewith adjacent the delivery end thereof.

DOUGLAS R. CLARKSON.